United States Patent
Petit

(10) Patent No.: US 6,762,996 B1
(45) Date of Patent: Jul. 13, 2004

(54) CELL TAGGING METHOD FOR BUFFERED AND FRAGMENTED FRAMES

(75) Inventor: Guido Henri Marguerite Petit, Antwerp (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/243,454

(22) Filed: Feb. 3, 1999

(30) Foreign Application Priority Data

May 2, 1998 (EP) .............................. 98400258

(51) Int. Cl.⁷ .................................... H04J 3/14
(52) U.S. Cl. ................... 370/230; 370/233; 370/252
(58) Field of Search ............................ 370/229–230.1, 370/231, 232–235, 252, 255, 395.1, 395.2, 395.42, 412, 413, 419, 395.21, 395.43, 429

(56) References Cited

U.S. PATENT DOCUMENTS

| 5,313,454 | A | | 5/1994 | Bustini et al. | |
|---|---|---|---|---|---|
| 5,524,006 | A | * | 6/1996 | Hluchyj et al. | 370/233 |
| 5,541,913 | A | * | 7/1996 | Witters et al. | 370/252 |
| 5,568,468 | A | * | 10/1996 | Ogasawara et al. | 370/230 |
| 5,666,353 | A | | 9/1997 | Klausmeier et al. | |
| 5,764,641 | A | * | 6/1998 | Lin | 370/412 |
| 6,072,773 | A | * | 6/2000 | Fichou et al. | 370/230 |
| 6,266,327 | B1 | * | 7/2001 | Hernandez-Valencia | 370/252 |

OTHER PUBLICATIONS

M. Gerla et al, LAN/Man Interconnection to ATM: A Simulation Study One World Through Communications, Florence, May 4–8, 1992, vol. 3, No. Conf. 11, Jan. 1, 1992, Institute of Electrical and Electronics Engineers, pp. 2270–2279, XP000300352.

Traffic and Congestion Control in ATM Networks, pp. 302–340, Asynchronous Transfer Mode: Solution for Broadband ISDN.

* cited by examiner

*Primary Examiner*—Steven H. D. Nguyen
*Assistant Examiner*—Phuongchau Ba Nguyen
(74) *Attorney, Agent, or Firm*—Sughrue Mion, PLLC

(57) ABSTRACT

A traffic policer is coupled to a network buffer. A cell stream is supplied to this traffic policer. When a frame has a mix of tagged and non-tagged cells, the distribution of tagged and non-tagged cells is determined. Based on this distribution and some predetermined criteria, a decision is made to tag all cells of the frame or to set all tags to non tagged in the frame. Exiting frames only exist of all tagged cells or all non tagged cells. Entire frames are discarded in case of congestion.

7 Claims, 1 Drawing Sheet

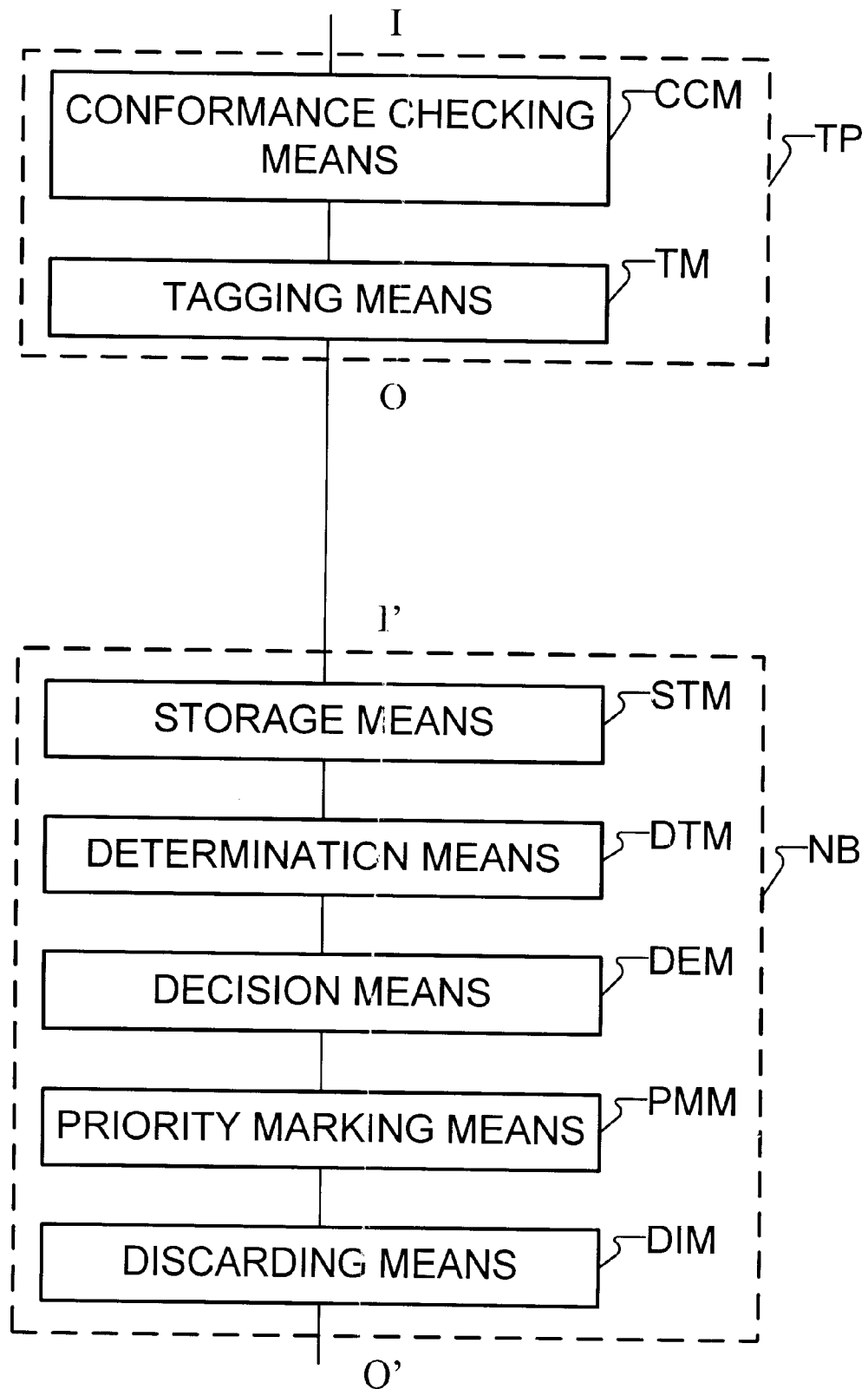

CELL TAGGING METHOD FOR BUFFERED AND FRAGMENTED FRAMES

BACKGROUND OF THE INVENTION

The present invention relates to a network policing method for cell tagging within a communications network as described in the preamble of claim 1 and related device as described in the preamble of claim 2.

Such a cell tagging method is already known in the art, e.g. from the section "Traffic and Congestion Control in ATM Networks", pages 302–340 in Asynchronous Transfer Mode: Solution for Broadband ISDN, third edition, from the author Martin de Prycker. Therein, a cell based traffic policing method called Usage Parameter Control (UPC), containing the steps of checking cells called determining cells to be conforming or non-conforming and tagging cells called cell tagging is described.

Since in a cell based tagging method only single cells from a frame are tagged, the frame may exist of a mix of tagged and non-tagged cells. In case of congestion the tagged cells might be discarded from the frame leaving incomplete frames in the network. Since incomplete frames are useless from an application point of view, hence the presence of these frames decreases network throughput.

This situation can be improved by using frame based traffic policing methods but, these often have the disadvantage that a number of cells of the entire frame which should be tagged, already have left the traffic policer. Only the cells that still remain within the traffic policer can be tagged. A frame exist of a mix of tagged and non-tagged cells is left then in the communications network. In case of congestion the tagged cells might be discarded from the frame leaving incomplete frames in the network. If such incomplete frames are not used anywhere in the communication network, then again the presence of these frames decreases network throughput.

As a remark on this frame based policing methods it should be mentioned that there are frame based policing algorithms possible and available not having the disadvantage of leaving corrupted frames within the network. One of those methods is described in the U.S. Pat. No. 5.666.353 with title "Frame based traffic policing for a digital switch". However the disadvantage of this kind of methods is that the network has to support this method throughout the entire network to avoid incomplete frames within the network. This is very unlikely in the near future because it should be agreed and supported by all network operators.

Summarising the former, it can be said that applying traffic policing methods in a communication network in general, involves that the frames within the communication network may be incomplete because of a number of different possible problems as mentioned before. If such incomplete frames are not used anywhere in the communication network, then the presence of these frames decreases network throughput.

SUMMARY OF THE INVENTION

An object of the present invention is to provide a cell tagging method of the above known type and related devices adapted to perform this method, but wherein the network throughput is improved.

According to the invention, this object is achieved by the method described in claim 1 and the network buffer described in claim 2.

Indeed by determining a tagged cell distribution within a frame by the network buffer a decision on the distribution of tagged cells within this frame can be made. Based on this decision all cells of the entire frame can be marked with a low or high cell loss priority. In this way the network only transports frames consisting of tagged cells only or non-tagged cells only. If all cells have the same cell loss priority, the entire frame will be passed or discarded in case of congestion. In case of congestion within the network, no incomplete frames are transported through the network. Network resources consequently are no longer occupied by incomplete frames that are not used.

BRIEF DESCRIPTION OF THE DRAWINGS

The above and other objects and features of the invention will become more apparent and the invention itself will be best understood by referring to the following description of an embodiment taken in conjunction with the accompanying drawing that represents, for the present invention, a relevant part of a Telecommunications network wherein a method for cell tagging according to the present invention is applied. The part of the telecommunications network drawn in the figure comprises a traffic policer TP and a network buffer NB which are interconnected and along which a communications path is set-up.

DETAILED DESCRIPTION OF THE INVENTION

In the following paragraphs, referring to the drawing, the relevant part of the before mentioned telecommunications network will be described wherein an implementation of the method according to the present invention is executed. In the first paragraph the elements of the network in the figure are described together with the interconnections between all Network elements and in the second paragraph, the actual execution of the cell togging method is described.

The traffic policer TP and the network buffer NB are the main elements of the present invention. In the present invention the traffic policer TP is built up of the following functional elements, whereby each element is coupled to the next mentioned element.

At first there is a conformance checking means CCM having an input terminal I which is also an input terminal of the traffic policer TP, which checks an incoming cell to determine if this incoming cell is in accordance with some predetermined conformance criteria.

The second element is the tagging means TM, which is able to tag a cell if a cell is found to be non-conforming. TM has an output terminal O which is also an output terminal of the traffic policer TP.

The main task of the traffic policer TP is guarding if the input the network subscriber delivers to the communications network is conforming to agreements made upon this subject between network provider and network subscriber. In case traffic is not conforming, the traffic policer TP is taking action to prevent the network from overload and congestion consequently by tagging cells.

The main task of the buffer NB is temporarily storing cells before forwarding them to the downstream network elements. In case of congestion the network buffer NB takes care of incoming cells according to a predefined strategy to handle these cells.

In the present invention the network buffer NB, is built up of the following described functional elements, whereby each element is coupled to the next mentioned element. The first element is a storage means STM, which is able to temporarily store incoming cells and has an input terminal I' which is also the input terminal of the network buffer NB.

The second element is the determination means DTM, which is able to determine a distribution of tagged cells within the frame. This element is followed by the decision means DEM, which has facilities to make a decision to mark a cell loss priority of each cell of the frame with a low or high priority, whereby the decision is based on the before mentioned distribution and on a set of predetermined criteria. The decision means are succeeded by the cell priority marking means PMM, which is able to change the value of the cell loss priority indicator of a cell of the corresponding frame depending on the before mentioned decision. The last element of the network buffer NB is the cell discarding means DIM, adapted to discard tagged cells from the buffer in case of congestion.

An output terminal O' of DIM is also an output terminal of the network buffer NB.

The output O of the traffic policer is coupled to the input I' of the network buffer NB.

Then the output of the network buffer NB O' on its turn can be coupled to the input of another network buffer.

In order to explain the operation of the present invention it is assumed that a stream of cells is fed to I of the traffic policer TP.

First the checking if incoming cells are in accordance with the predetermined conformance criteria is done. This conformance checking means CM of the traffic policer TP performs its conformance checking according to a pre-defined policing algorithm. This algorithm may be a cell based or a frame based algorithm. If cells are not conforming to the pre-agreed traffic contract the tagging means TM tags the non-conforming cell or cells. The frame to which the tagged cell belongs, now consists of a mix of tagged and non-tagged cells as consequence of this cell togging. This frame, consisting of a tagged and non-tagged cell mix, is led through the storage means STM. Then the determination means DTM determines the distribution of the number of tagged and non-tagged cells within the before mentioned frame. The determination of the distribution is followed by the decision-making if the cells of this frame should be marked with a high cell loss priority (tagging) or if all cells of this frame should be marked with a low cell loss priority. This decision is made based on the actual distribution and a set predetermined criteria. For example the simple criterion of a distribution of 50 percent could be used, which means that if the distribution of tagged cells within the frame is equal to or higher than half of the number of cells of the frame, all non tagged cells will be marked with a high loss priority (tagged) and otherwise all tagged cells will be marked with a low cell loss priority. The actual marking is done by the priority marking means PMM. The last element of the network buffer is the discarding means DIM which can discard cells from a cellstream for instance in case of congestion.

While the principles of the invention have been described above in connection with specific apparatus, it is to be clearly understood that this description is made only by way of example and not as a limitation on the scope of the invention, as defined in the appended claims.

What is claimed is:

1. A method for traffic policing in a telecommunications network through which cells arranged in frames are transmitted, said telecommunications network including at least one traffic policer coupled to a network buffer to which said cells are supplied, said method comprising:
   a. checking conformance with predetermined rules of each cell of said cells;
   b. tagging said cell by setting a cell loss priority indicator in said cell when said cell is a non-conforming cell;
   c. determining, in said network buffer, a tagged cell distribution within a frame;
   d. making a comparison of said distribution with a predetermined criterion; and
   e. in said network buffer, conforming the cell loss priority indicator of all cells of said frame according to the result of said comparison, wherein:
      when said comparison of said distribution with said predetermined criterion indicates that the frame should have a high cell loss priority, the cell loss priority indicator of all buffered cells of the frame is set to a high cell loss priority value; and
      when said comparison of said distribution with said predetermined criterion indicates that the frame should have a low cell loss priority, the cell loss priority indicator of all buffered cells of the frame is set to a low cell loss priority value.

2. A network buffer for use in a telecommunications network through which cells arranged in frames are transmitted and adapted to be coupled to a traffic policer adapted to check each cell of cells within a frame for conformance with predetermined rules and to tag said cell by setting a cell loss priority indicator in said cell when said cell is nonconforming, said network buffer comprising:
   a. a storage module adapted to temporarily store said cells;
   b. a cell discarding module adapted to discard cells from said buffer in case of congestion and when said cells are tagged;
   c. a determination module adapted to determine a distribution of tagged cells within said frame;
   d. a decision module adapted to make a decision as to whether to mark said cell loss priority of each cell of said frame with a low or high priority, based on said distribution and on a predetermined criterion;
   e. a cell priority marker adapted to conform the value of said cell loss priority indicator of the cells of said frame in accordance with said decision; and
   the cell priority marker is configured to conform the cell loss priority of all buffered cells of the frame to a high cell loss priority value, when a comparison of said distribution with said predetermined criterion indicates that the frame should have a high cell loss priority; and
   the cell priority marker is configured to conform the cell loss priority of all buffered cells of the frame to a low cell loss priority value, when said comparison of said distribution with said predetermined criterion indicates that the frame should have a low cell loss priority.

3. A buffer for use in a telecommunications network, comprising:
   means for temporarily storing a frame of cells;
   means for conforming the value, of a loss priority indicator of all the cells of the stored frame to an identical value based on a distribution of tagged cells in the frame, wherein:
      when said distribution indicates that the frame should have a high cell loss priority, the cell loss priority indicator of all buffered cells of the frame is set to a high cell loss priority value; and
      when said distribution indicates that the frame should have a low cell loss priority, the cell loss priority indicator of all buffered cells of the frame is set to a low cell loss priority value.

4. The buffer as set forth in claim 3, further comprising means for discarding the cells of the stored frame, in response to an indication of network congestion.

5. The buffer as set forth in claim 3, further comprising means for making a comparison of the tagged cell distribution with a predetermined threshold.

6. The buffer as set forth in claim 5, wherein the comparison is used by the means for conforming to determine the value of the loss priority indicator.

7. A telecommunications network cell policing system through which a plurality of cells arranged in a frame are transmitted, the system comprising:
- a policer configured to check one cell of the plurality of cells for conformance with at least one pre-agreed criterion and to tag a cell that is non-conforming with the criterion;
- a buffer coupled to said policer, said buffer comprising:
  - a storage module configured to store temporarily cells of the plurality of cells of the frame;
  - a cell discarder configured to discard a cell of the plurality of cells of the frame from said buffer, in case of congestion when said cells are tagged;
  - a determination module configured to determine a distribution of tagged cells of the plurality of cells of the frame;
- a decision module configured to decide as to whether to mark a cell loss priority of each cell of the plurality of cells of the frame with one of a low priority and a high priority, based on the distribution and based on a predetermined criterion;
- a cell priority marker configured to conform the value of said cell loss priority indicator of the cells of the plurality of cells of the frame in accordance with the decision; and
- said cell priority marker further configured to conform the cell loss priority of all buffered cells of the frame to a high cell loss priority value, when a comparison of said distribution with said predetermined criterion indicates that the frame should have a high cell loss priority, and to conform the cell loss priority of all buffered cells of the frame to a low cell loss priority value, when said comparison of said distribution with said predetermined criterion indicates that the frame should have a low cell loss priority.

* * * * *